US012608630B1

(12) United States Patent
Gibson

(10) Patent No.: US 12,608,630 B1
(45) Date of Patent: Apr. 21, 2026

(54) DATA MODELING OF MATTER THROUGH SPACE-TIME WITH A LINKED DATA HYPERGRAPH (LDH)

(71) Applicant: Graphmetrix, Inc., San Francisco, CA (US)

(72) Inventor: Frederick C. Gibson, San Francisco, CA (US)

(73) Assignee: GraphMetrix, Inc., San Francisco, CA (US)

( * ) Notice: Subject to any disclaimer, the term of this patent is extended or adjusted under 35 U.S.C. 154(b) by 997 days.

(21) Appl. No.: 17/733,593

(22) Filed: Apr. 29, 2022

Related U.S. Application Data

(60) Provisional application No. 63/181,724, filed on Apr. 29, 2021.

(51) Int. Cl.
| | |
|---|---|
| *G06N 5/04* | (2023.01) |
| *G06F 16/2458* | (2019.01) |
| *G06F 16/28* | (2019.01) |
| *G06F 16/901* | (2019.01) |

(52) U.S. Cl.
CPC ........... *G06N 5/04* (2013.01); *G06F 16/2477* (2019.01); *G06F 16/288* (2019.01); *G06F 16/9024* (2019.01)

(58) Field of Classification Search
CPC .............................. G06N 5/04; G06F 16/2477
See application file for complete search history.

(56) References Cited

U.S. PATENT DOCUMENTS

| | | | |
|---|---|---|---|
| 10,019,537 B1 * | 7/2018 | Tsypliaev ............ | G06F 16/9024 |
| 11,086,908 B2 | 8/2021 | Arnaut et al. | |
| 2018/0089281 A1 * | 3/2018 | Li ........................ | G06F 16/9538 |
| 2018/0314705 A1 * | 11/2018 | Griffith ................. | G06F 16/185 |
| 2019/0325329 A1 * | 10/2019 | Rais-Ghasem ..... | G06F 16/9024 |
| 2020/0285788 A1 * | 9/2020 | Brebner ................ | G06F 18/251 |
| 2021/0390141 A1 * | 12/2021 | Jacob .................... | G06F 9/3877 |
| 2022/0138492 A1 * | 5/2022 | Paulson .................. | G06F 30/13 |

* cited by examiner

*Primary Examiner* — Courtney Harmon
(74) *Attorney, Agent, or Firm* — Lambert Shortell & Connaughton; David J. Connaughton, Jr.; Justin P. Tinger

(57) ABSTRACT

A Linked Data Hypergraph (LDH) System and method that serializes RDF data in a plurality of triples where some of the plurality of triples form two-triple hyperedges with a hypernode as common node in either the triple subject or triple object position. The LDH system and method using a Linked Data Hypergraph Ontology (LDHO) enables an improved query and modeling of digital twin objects through space-time. The LDH system operates using an RDF graph database having a plurality of named graphs each serializing a digital twin of an object and wherein each named graph and each serialized digital twin has a URI associated therewith and a Linked Data Hypergraph Awareness (LDHA) configured to use the LDHO specifications to transform each of the serialized digital twins into a digital twin model when loaded, perform inference, and respond to queries with answers returned in RDF Linked Data.

12 Claims, 14 Drawing Sheets

LINKED DATA HYPERGRAPH - HYPERNODE DATA STRUCTURE

LINKED DATA HYPERGRAPH - LDHO SUBCLASS INHERITANCE

LINKED DATA HYPERGRAPH - LINKED DATA GRAPHIC LEGEND

LINKED DATA HYPERGRAPH - HYPERNODE DATA STRUCTURE

ATTRIBUTE HYPERNODE 101

STATE HYPERNODE 104

TIME ATTRIBUTE 102

CAPABILITY STATE 108

CAPABILITY ATTRIBUTE 109

STATE START TRIPLE 105

STATE END TRIPLE 106

INHERIT TRIPLE 103

STATE FOLLOWS TRIPLE 107

LINKED DATA HYPERGRAPH - EVENT DATA STRUCTURE

LINKED DATA HYPERGRAPH - PROCESS DATA STRUCTURE

LINKED DATA HYPERGRAPH - SYSTEM PART DATA STRUCTURE

LINKED DATA HYPERGRAPH - CONTAINER CONTAIN DATA STRUCTURE

LINKED DATA HYPERGRAPH - TOPOLOGICAL TYPE INFERENCE

LINKED DATA HYPERGRAPH - ADDED STATE INFERENCE

STATE ADDED TO SYSTEM
701

FUNCTION SPECIFICATION RETRIEVED
FROM LDHO 702

ENTITY TYPE INFERENCE BASED ON
INPUT SPECIFICATION 703

RESULT TYPE INFERENCE BASED ON
OUTPUT SPECIFICATION 704

STATE TYPE INFERENCE BASED ON
ATTRIBUTION SPECIFICATION 705

LINKED DATA HYPERGRAPH - ADDED EVENT CAUSAL INFERENCE

EVENT ADDED TO SYSTEM
801

FUNCTION SPECIFICATION RETRIEVED
FROM LDHO 802

WHEN FUNCTION CREATES NEW
STATES, COLLECT OUTPUT EVENTS OF
INPUT STATES 803

ADD CAUSAL TRIPLE 206 BETWEEN
OUTPUT EVENT AND NEW EVENT 804

LINKED DATA HYPERGRAPH - QUERY OBJECT WITH URI

LINKED DATA HYPERGRAPH - LINKED DATA INTERFACE METHOD

LINKED DATA HYPERGRAPH - LINKED DATA INTERFACE METHOD 2

DATA MODELING OF MATTER THROUGH SPACE-TIME WITH A LINKED DATA HYPERGRAPH (LDH)

REFERENCE TO RELATED APPLICATIONS

This application claims the benefit of U.S. Provisional Patent Application No. 63/181,724 filed on Apr. 29, 2021; which is herein incorporated by reference in entirety.

FIELD

The present application is related to a Linked Data Hypergraph for capturing the full connected data modeling of matter through space-time for any part of the world and methods for using the same.

BACKGROUND

The key problem with industry standard Linked Data (LD) in a Resource Description Framework (RDF) is its ability only to capture what is true now with a lack of provision for capturing how and why information changes over time. There are many public ontologies that capture different silos of definitions without providing a way to show how all things are ultimately related, and in particular how they are related through space and time.

The present solutions seek to address these and other problems by providing a new hypergraph data structure, the Linked Data Hypergraph (LDH), built on top of LD, as well as a Linked Data Hypergraph Ontology (LDHO) that specifies the types and functions for modeling matter changing through space-time that relates all information to the broadest type, a modeled object.

SUMMARY

The embodiments of systems and methods disclosed herein are set to utilize a Linked Data Hypergraph Structure and Linked Data Hypergraph Ontology to be able to model any object through space-time, while being able to communicate with industry standard Linked Data formats in any of the RDF formats currently available.

For example, in one method embodiment, the method includes saving or loading resource framework description (RDF) data to a graph database where the RDF data is saved or loaded as a Linked Data Hypergraph structure (LDHS), and wherein the LDHS utilizes a plurality of triples, where some of the plurality of triples are linked by a triple subject or triple object hypernode.

In this method, the triple subject hypernodes can be an attribute hypernode. In this method, the triple object hypernodes can be a state hypernode.

The method embodiment above can further include the step of utilizing a Linked Data Hypergraph ontology (LDHO) to: 1) infer object types from the LDHS; 2) infer object types from LDHO; 3) retrieve objects using the LDHS; 4) infer causality from the LDHS; and 5) interface with standard Linked Data systems.

The above method embodiment wherein constructing the LDHS comprises: 1) creating a plurality of Attribute hypernodes each in the form of two triples capturing the Function node and Result node for each attribute; 2) creating a plurality of Attribute hierarchies by creating triples with subject and object attribute hypernodes with an inherit predicate; 3) creating a plurality of state hypernodes each in the form of two triples capturing the entity and attribute for each state; 4) creating a plurality of state hypernodes where triples with a state in the subject position:
- i) have predicate start and a time hypernode in object position,
- ii) have predicate end and a time hypernode in object position;

5) creating a plurality of triples where state hypernodes are in the subject and object position using the predicate follows; 6) creating a plurality of capability states where the entity is a system and the attribute hypernode function is capable and the attribute hypernode result is a function the system is capable of performing; 7) creating a plurality of event nodes where triples with the event in the subject position:
- i) have predicate execute and a capability state hypernode in object position,
- ii) have predicate start and a time attribute hypernode in object position,
- iii) have predicate end and a time attribute hypernode in object position,
- iv) have predicate output and a state hypernode in object position,
- v) have predicate cause and an event node in object position;

6) creating a plurality of event nodes where triples with the event in the object position:
- i) have predicate input with a state hypernode in the subject position,
- ii) have predicate cause with an event node in the subject position;

7) creating a plurality of process nodes where triples with the process in the subject position:
- i) have predicate execute and a capability state hypernode in the object position,
- ii) have predicate start-event and an event node in the object position,
- iii) have predicate end-event and an event node in the object position;

8) creating a plurality of process nodes that are the entities in state hypernodes with attributes that have function contain with result event.

The above method embodiment, wherein inferring object types from the data structure comprises at least one of the following: 1) inference of type Attribute for a plurality of triple subjects where triples have either a function or result predicate; 2) inference of type Function for triple objects that have a function predicate; 3) inference of type Result for triple objects that have a result predicate; 4) inference of type State for a plurality of triple objects where triples have either an entity, attribute, follows, or output predicate; 5) inference of type State for a plurality of triple subjects where triples have a follows predicate; 6) inference of type Entity for a plurality of triple subjects where triples have an entity predicate; 7) inference of type Attribute for a plurality of triple subject where triples have an attribute predicate; 8) inference of type State for a plurality of triple subjects where triples have an input predicate; 9) inference of type Capability for any state hypernode with attribute hypernode having function capable; 10) inference of type System for the entity of any state hypernode with attribute hypernode function capable; 11) inference of type Event for a plurality of triple subjects where triples have either a cause or output predicate; 12) inference of type Event for a plurality of triple objects where triples have either a cause or input predicate; 13) inference of type Cause for a plurality of triple subjects where triples have a cause predicate; and 14) inference of type Effect for a plurality of triple objects where triples have a cause predicate.

The embodiment method above, wherein any one of the following classes is specified in the LDHO with unique URIs: 1) specification of the class Object, the root of the class hierarchy, representing anything that can be modeled; 2) specification of the class Attribute, a subclass of Object, which models in a single object the result of a system performing a function without reference to any object used as input to that function, the system that performed that function, or any time when that function was performed; 3) specification of the class State, a subclass of Object, which models in a single object an entity having a material or spatial measurement attribute for a distinct period of time and serialized in RDF with the State hypernode; 4) one or more states, but may no longer have any current states; 5) specification of the class Entity, a subclass of Object, which models any object that has or had specification of the class Change, a subclass of Object, which models the transformation of space during a period of time; 6) specification of the class Event, a subclass of Change, which models a system performing a function to transform input states to output states during a distinct period of time that also may cause or be caused by other events; 7) specification of the class Process, a subclass of Change, which models a causally linked plurality of events that may be specified with a workflow; and 8) specification of the class Function, a subclass of Entity, which specifies how any system can change input states to output states.

A computer implemented Linked Data Hypergraph system, configured to perform the following operation services: 1) an RDF graph database having a plurality of named graphs each serializing a digital twin of an object and wherein each named graph and each serialized digital twin have a URI associated therewith; and 2) a Linked Data Hypergraph Awareness (LDHA) configured to transform each of the serialized digital twins into a digital twin model when loaded.

The system embodiment above, wherein each of the digital twin objects represents a full serialization of matter through space-time for that digital twin object.

The system embodiment above, wherein one of the digital twin objects represents a serialization of a Linked Date Hypergraph Ontology (LDHO).

The system embodiment above, wherein the LDHO is comprised of a plurality of related objects.

The system embodiment above, wherein the LDHA is further configured to fully load a current state of all of the related objects of the LDHO.

The system embodiment above, wherein the LDHA is further configured to respond to a URI http request by: 1) locating the serialized digital twin of an object represented by the URI http request; 2) determining a type for the URI http requested object; 3) loading and transforming a serialized context for the URI http requested object based on the determined type into a digital twin model in the LDHA; and 4) returning an http response in serialized RDF format.

The system embodiment above, wherein the LDHA is configured to perform the step of: inferring relationships and additional types using LDHO modeled requirements after the loading and transforming step.

These and other embodiments, as well as variations to the above will become apparent to those skilled in the art with the additional description provided below.

BRIEF DESCRIPTION OF DRAWINGS

The foregoing and other objects, features, and advantages of the invention will be apparent from the following description of particular embodiments of the invention, as illustrated in the accompanying drawings in which like reference characters refer to the same parts throughout the different views. The drawings are not necessarily to scale, emphasis instead being placed upon illustrating the principles of the invention.

DETAILED DESCRIPTION

As noted in the background, one of the shortcomings of current RDF graph data model is that it doesn't account for or link space-time data as part of the model. The present embodiments and methods described in further detail are able to integrate space-time data as part of a Linked Data Hypergraph structure.

To further convey this point, one of the limitations of current RDF linked data is that the linked data is only presented in the form of triples, which link a subject to an object via a predicate. As one sees, this type of triple doesn't answer the questions of where were things occurring, when were those things occurring, how long was it occurring and so forth. For example, if Person A spoke with Person B, this real-world situation could be formed in a triple, as Person A being the subject, speaking which is the linking predicate, and Person B is the object in a traditional Linked Data triple. With this standard triple there is no ability to link this to events or states, which can further answer additional questions of when, how, why and so forth. By solving this ability to link to states and events, the LDH structure creates the ability to search and perform queries in additional ways, because there now exist additional parameters about how information is linked. This searching and material linking resembles more of traditional human thought processes, which doesn't simply think in the now, but automatically recalls and makes connections using space-time.

Another advantage of the methods and systems described herein are they have an effect of reducing the amount of data needing to be stored, because of the additional connecting relationships, which enables fewer redundancies of types of information being stored. For example, because of the added space-time relationships multiple copies of a system don't need to exist as related to a space or time component. One such example might include a ballgame held at a particular stadium on a particular day. Multiple subjects (people, systems, etc.) interact with the stadium (object), in various ways on a particular date. For data storage purposes if 10,000 fans each interacted with the stadium, on a particular date, one copy of the existing stadium could exist at that time, but be linked to 10,000 people or data points. Thus, 10,000 people don't need to have their own copy of the stadium, merely the relationship and access.

Figure 1A:
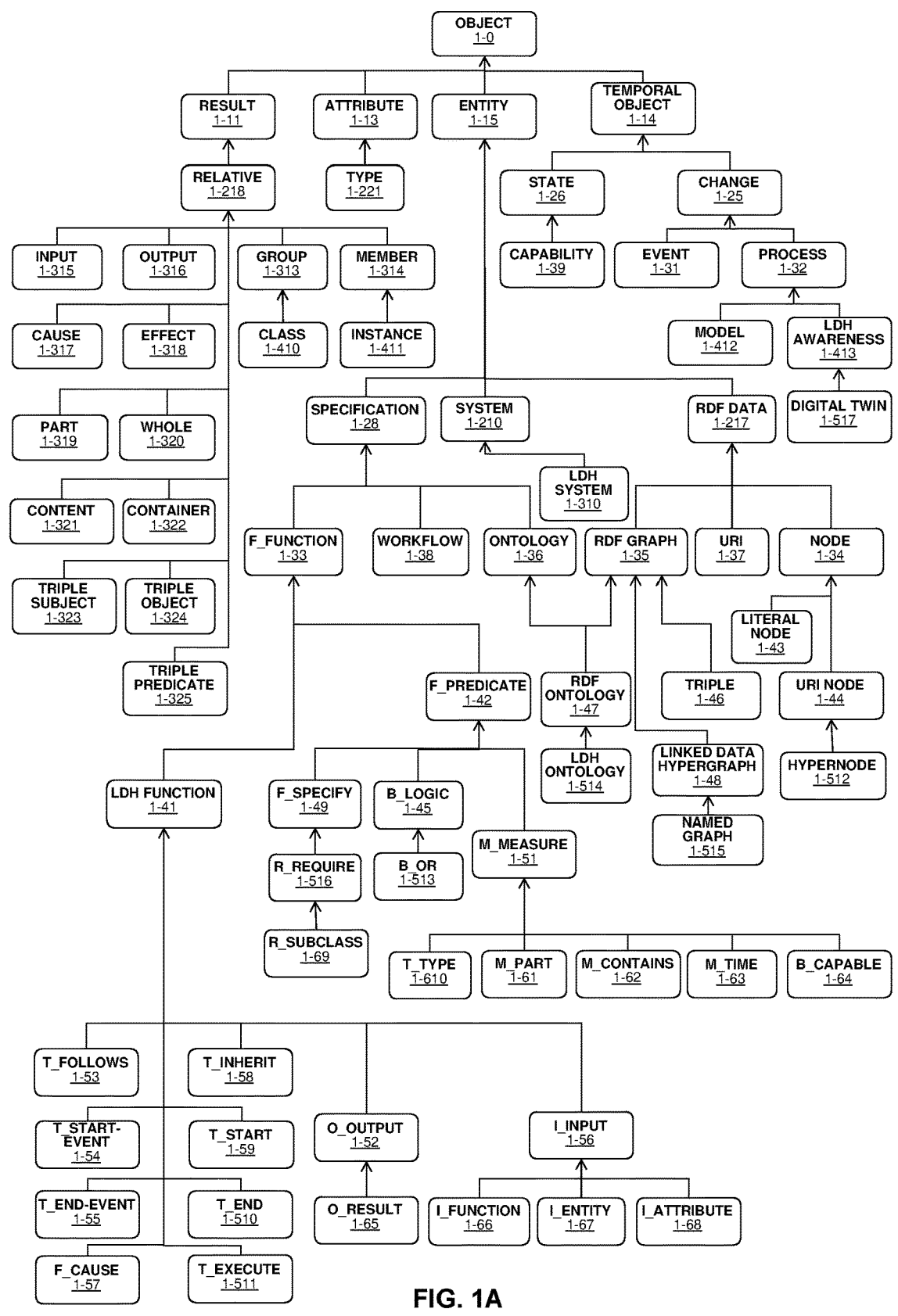
FIG. 1A illustrates the r_genus (1-69) inheritance of the LDHO classes.

The Linked Data Hypergraph Ontology Subclass Inheritance is diagrammed in FIG. 1A with arrows indicating inheritance from more specific definition classes to broader definition classes moving up using the R_SUBCLASS (1-69) function. All definitions ultimately are more specific than the broadest definition for the root class Object (1-0).

To provide clarity, the applicants would like to provide context around certain terms used throughout this description that is in addition to their ordinary meaning. Two differentiate functions from other types of classes, functions terms include a prefix such as F_(for function) I_(for input) O_(for output), M_(for measure), B_(for logic), T_(for time), R_(for require).

Definitions

Attribute (1-13): An Object with a unique URI capturing the i_function 1-66 and o_result 1-65 caused by a change while omitting the system that performed the function to cause the change as well as omitting the input states to that change. (See State where the Attribute is attributed to a specific Entity) An attribute is immutable and timeless. For example, a doctor can perform the function of measuring the height of Bob and output a state that attributes height 6'-0" to entity Bob. Omitting Bob and the measuring doctor, the resulting attribute has function: height, result 6'-0". The attribute is serialized in RDF as a hypernode composed of two triples with the attribute URI node serving as triple subject for both the i_function and o_result triples see 101 in FIG. 1C.

Capability (1-39): An instance of type state 1-26 indicating that the entity 1-15 of the state is a system 1-210 by virtue of it being currently b_capable 1-64 of performing the function 1-33 indicated by the result 1-11 in the attribute. The capability is executed by an event and serialized with the t_execute 1-511 triple 201 thus making a very simple link that enables understanding what function was performed by what system in an event, and from the system perspectives, what events were executed during the period of time that the system was capable of performing a given function.

B_Capable (1-64): An LDH Function 1-41 specifying the requirements of determining if an entity can perform a function.

Change (1-25): A temporal object with a unique URI, unlike a state which doesn't change during its existence, represents the period of time during which a material or spatial transformation occurs in the form of a difference between input states and output states to the change event or process.

Class (1-410): A class is a group 1-313 of objects which can be unambiguously defined by an attribute 1-13 that all its members share.

M_Contains (1-62): An f_predicate 1-42 when used in a state 1-26 & 503, captures the entity 1-15 of the state acting as a container 1-322 for the result 1-11 of the attribute 1-13

Figure 5:
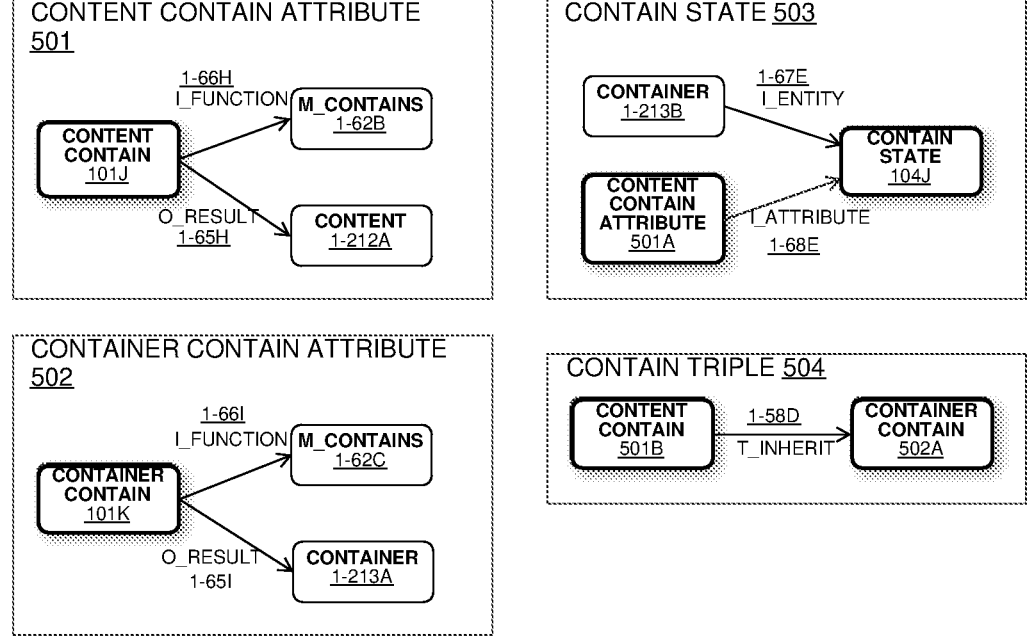
FIG. 5 is a visual graph illustrating contain data structure elements associated with a Linked Data Hypergraph.

& 501 for that state. The result is contained inside the entity. FIG. 5. Additionally, a hierarchy is created with the Container attribute 502 and content attribute 501 by adding a t_inherit 1-58 triple 504 as illustrated in FIG. 5.

Container (1-322): A object 1-0 b_capable 1-64 of containing (m_contains 1-62) other objects as content 1-321.

Context: Refers to all of the objects related directly to a given object 1-0. For example, the context around an entity 1-15 would include all of the states 1-26 of that entity, any events 1-31 that entity has been involved with both as a system 1-210 performing a function 1-42 or the entity states as input 1-315 or output 1-316, any states where that entity is the result 1-11 of the attribute 1-13.

Digital Twin (1-517): (wikipedia) is a virtual representation that serves as the real-time digital counterpart of a physical object or process. Though the concept originated earlier (attributed to Michael Grieves, then of the University of Michigan, in 2002) the first practical definition of digital twin originated from NASA in an attempt to improve physical model simulation of spacecraft in 2010.

Directed Graph: is a graph in which the edges have a distinguished direction, from one vertex (node) to another; directed edges may also be called arcs or arrows. The RDF Graph (1-35) is such a graph, and in the ontology, system and methods described herein inherits the standard RDF ontology (1-47), which inherits the LDH ontology (1-514), as well as the LDH (1-48), each described further below.

Edge: An edge is (together with vertices) one of the two basic units out of which graphs are constructed. Each edge has two (or in hypergraphs, more) vertices to which it is attached, called its endpoints. Edges may be directed or undirected; undirected edges are also called lines and directed edges are also called arcs or arrows. In an undirected simple graph, an edge may be represented as the set of its vertices, and in a directed simple graph it may be represented as an ordered pair of its vertices. An edge that connects vertices x and y is sometimes written xy.

Entity (1-15): An Object with a unique URI that currently or in that past had one or more states but itself is timeless. For example, the entity Aristotle refers to a person that lived over 2 thousand years ago and had states including the attribute type-Person at that time. Although there may still be material states remaining from Aristotle in existence, the state of Aristotle being type-person no longer exists.

Event (1-31): A change object with unique URI that represents a change of input state(s), serialized by the i_input triple 204 to output state(s) serialized by the o_output triple 205 by a system performing a function between t_start 202 and t_end 203 time of that event. Only state objects can be input or output to or from events. An event may cause or be caused by other events serialized with the f_cause triple 206. The system performing a function is captured by that system's capability state 108 which is executed by the event and serialized with the t_execute triple 201. All of these can be seen illustrated in FIG. 2.

F_Function (1-33): A specification of what happens when input is transformed to output during a change.

Graph: The fundamental object of study in graph theory, a system of vertices (nodes) connected in pairs by edges. Often subdivided into directed graphs or undirected graphs according to whether the edges have an orientation or not. Mixed graphs include both types of edges.

Group (1-313): A plurality of objects.

Hyperedge: Defined by an edge in a hypergraph, having any number of endpoints, in contrast to the requirement that edges of graphs have exactly two endpoints.

Hypernode (1-512): A Node in an RDF graph where two triples that together form a hyperedge share either a triple object or a triple subject where the URI of the node in common is then used to refer to the hyperedge Object. An Attribute hypernode has the triple subject as common node while the State hypernode has the triple object as the common node.

Inference: (wikipedia) deriving logical conclusions from premises known or assumed to be true, with the laws of valid inference being studied in logic. (deduction)

Instance (1-411): A member 1-314 of a class 1-410.

LDH Awareness (1-413): An active process of the LDH system which loads into memory the current requested URI and all related objects for a given named graph.

LDH Function (1-41): The following 14 functions are the only functions used as triple predicates in any LDH RDF serialization of any digital twin 1-517: i_input 1-56, i_function 1-66, i_entity 1-67, i_attribute 1-68, o_output 1-52, o_result 1-65, t_inherit 1-58, t_start 1-59, t_end 1-510, t_follows 1-53, t_execute 1-511, t_start-event 1-54, t_end-event 1-55, f_cause 1-57.

Linked Data (LD): In computing, linked data is structured data which is inter linked with other data so it becomes more useful through semantic queries. It builds upon standard Web technologies such as HTTP, RDF and URIs, but rather than using them to serve web pages only for human readers, it extends them to share information in a way that can be read automatically by computers. Part of the vision of linked data is for the Internet to become a global database.

Linked Data Hypergraph (LDH) (1-48): A directed graph using Linked Data with one or more hyperedges.

Linked Data Hypergraph Ontology (LDHO) (1-514): The ontology specified with the classes shown in FIG. 1A. The requirement states specified for these classes control the behavior of the LDH Awareness operations. FIG. 1A shows the r_subclass requirement states for the LDHO.

Literal Node (1-43): RDF Literals are used to identify values such as numbers and dates by means of a lexical representation. A literal may be the Triple Object but may not be a Triple Subject or Triple Predicate in an RDF Triple. Literals may be plain or typed:

A plain literal is a string combined with an optional language tag. This may be used for plain text in a natural language. As recommended in the RDF formal semantics [RDF-SEMANTICS], these plain literals are self-denoting.

A typed literal is a string combined with a datatype URI. It denotes the member of the identified datatype's value space obtained by applying the lexical-to-value mapping to the literal string.

B_Logic (1-45): An f_predicate 1-42 class of functions which specify the use of the rules of valid reasoning to transform input into output.

Matter: In classical physics and general chemistry, matter is any substance that has mass and takes up space by having volume. All everyday objects that can be touched are ultimately composed of atoms, which are made up of interacting subatomic particles, and in everyday as well as scientific usage, "matter" generally includes atoms and anything made up of them, and any particles (or combination of particles) that act as if they have both rest mass and volume. Matter exists in various states (also known as phases).

M_Measure (1-51): An f_predicate 1-42 class of functions. Quantification of a state 1-26 based on a standard that acts as a unit. Described by Ayn Rand: the identification of a quantitative relationship established by means of a standard that serves as a unit. Entities (and their actions) are measured by their attributes (length, weight, velocity, etc.)

and the standard of measurement is a concretely specified unit representing the appropriate attribute. Thus, one measures length in inches, feet and miles-weight in pounds-velocity by means of a given distance traversed in a given time, etc.

Model (1-412): An active process of representing objects and their relationships for computation and cognition.

Named Graph (1-515): a key concept of Semantic Web architecture in which a set of Resource Description Framework statements (a graph) are identified using a URI, allowing descriptions to be made of that set of statements such as context, provenance information or other such metadata. In the case of the LDH, the URI for a Named Graph represents a part of the world, like a person or organization or building. That URI then can be used in triples, states and attributes to link to other parts of the world.

Node (1-34): A synonym for a graph vertex. An RDF node may be a URI with optional fragment identifier (URI reference, or URIref), a literal, or blank (having no separate form of identification).

Object (1-0): The root class of the LDHO which represents a model of anything in the world.

Ontology (1-36): In computer science and information science, an ontology encompasses a representation, formal naming, and definition of the categories, properties, and relations between the concepts, data, and entities that substantiate one, many, or all domains of discourse. More simply, an ontology is a way of showing the properties of a subject area and how they are related, by defining a set of concepts and categories that represent the subject.

In this case, Ontology refers specifically to an RDF graph defining the types, predicates and relations for a given context as opposed to the RDF triple data using that ontology to capture space/time instance data.

B_Or (1-513): A b_logic 1-45 function that selects the first true option in a list of options.

Part (1-319): An entity 1-15 that is b_capable 1-64 of performing a function 1-33 needed by a containing 1-322 system 1-210 but not able to provide the full function of the containing system. The result 1-11 in the m_part 1-61 attribute 401 attributed to the whole as an entity 1-15 in the part state 402.

M_Part (1-61): an m_measure 1-51 function used in a state 1-26 & 402 to indicate that the entity 1-15 attributed is the whole 1-320, and the result 1-11 of the attribute 1-13 & 401 is the part 1-319. Additionally, a triple 1-46 is added to link the whole attribute 403 and part attributes in a hierarchy 404 with the t_inherit 1-58 LDH function.

F_Predicate (1-42): A function 1-33 used in an attribute 1-13 that is not a member of the class of LDH Functions 1-41.

Process (1-32): Two or more causally linked events contained by the process 307 with a single start event 302 and a single end event 303 where the process, like an event, executes a capability 301 and the process acts as a container 1-322 for the events that occur during the process 304, 305 & 306.

RDF Data (1-217): The Resource Description Framework (RDF) is a World Wide Web Consortium (W3C) standard originally designed as a data model for metadata. It has come to be used as a general method for description and exchange of graph data. RDF provides a variety of syntax notations and data serialization formats with Turtle (Terse RDF Triple Language) currently being the most widely used notation. RDF is a directed graph composed of triple statements. RDF was adopted as a W3C recommendation in 1999. The RDF 1.0 specification was published in 2004, the RDF 1.1 specification in 2014. SPARQL is a standard query language for RDF graphs. RDFS, OWL and SHACL are ontology languages that are used to describe RDF data.

RDF Graph (1-35): one or more triples 1-46.

RDF Graph Database: A database system which stores and retrieves RDF graphs.

RDF Ontology (1-47): An RDF Graph 1-35 that captures the specifications for a given ontology 1-36

Relative (1-218): A result 1-11 in the form of an inferred type 1-221 of an inference wherein two or more objects are used as input to the inference event. Instances of Input 1-315 and output 1-316 are both states 1-26 that are either i_input 1-56 or o_output 1-52 to an event 1-31. Instances of cause 1-317 and effect 1-318 are events where the type cause is the event in the triple subject 1-323 position of the f_cause 1-57 triple, and events in the triple object 1-324 position are type effect. Instances of type Entity 1-15 can be either parts 1-319 of a whole or a whole 1-320 indicating a connecting relationship between the part and whole. The m_part function 1-61 is used in a state to indicate that the entity attributed is the whole, and the result of the attribute is the part. Additionally, a triple 1-46 is added to link the whole and part attributes in a hierarchy 404 with the t_inherit 1-58 LDH function. Instances of type content 1-321 and container 1-322 are in an active process where a system providing containment is the entity in a state where the function of the attribute is m_contain 1-62 and the result 1-11 of the attribute is the content being actively contained by the container. Additionally, a triple 1-46 is added to link the container and content attributes in a hierarchy 504 with the t_inherit 1-58 LDH function. Instances of the Triple Subject 1-323, Triple Predicate 1-325 and Triple Object 1-324 types indicate the position of an object in a particular triple 1-46, where Triple Subject is always the first position, Triple Predicate is always the second position, and Triple Object is always the third position.

R_Require (1-516): an f_specify 1-49 function which indicates that the entity 1-15 of the requirement state 1-26 must satisfy the requirement indicated in the result 1-11 of the requirement attribute 1-13.

Result (1-11): any Object 1-0 which is output 1-52 from an event 1-31 even when the specific event causing that output is omitted as in the case of an attribute 1-13. In an attribute, the result is the triple object 1-325 of the triple with predicate O_RESULT 1-65 as shown in 101.

Serialize: (wikipedia) the process of translating a data structure or object state into a format that can be stored (for example, in a file or memory data buffer) or transmitted (for example, over a computer network) and reconstructed later (possibly in a different computer environment). When the resulting series of bits is reread according to the serialization format, it can be used to create a semantically identical clone of the original object. For many complex objects, such as those that make extensive use of references, this process is not straightforward.

Space-time: In physics, space-time is any mathematical model which fuses the three dimensions of space and the one dimension of time into a single four-dimensional manifold.

SPARQL: (a recursive acronym for SPARQL Protocol and RDF Query Language) is an RDF query language—that is, a semantic query language for databases—able to retrieve and manipulate data stored in Resource Description Framework (RDF) format. It was made a standard by the RDF Data Access Working Group (DAWG) of the World Wide Web Consortium, and is recognized as one of the key technologies of the semantic web. On 15 Jan. 2008, SPARQL 1.0 was acknowledged by W3C as an official recommendation, and SPARQL 1.1 in March 2013. SPARQL allows for a query to consist of triple patterns, conjunctions, disjunctions, and optional patterns.

Specification (1-28): One or more requirements in the form of r_require 1-516 states 1-26 indicating the r_require attributes the object or class of objects being specified must have.

F_Specify (1-49): an f_predicate 1-42 function where the entity 1-15 in the specification state 1-26 is the entity to which the specification applies, and the result 1-11 of the f_specify attribute 1-13 is that which is being specified about the entity.

State (1-26): A temporal Object with a unique URI which attributes a material or spatial attribute to an entity over a period of time. A state is immutable and is not deleted from the database, but rather on creation the t_start triple (105) is added and on termination a t_end time triple (106) is added. For queries of the current state of the world, states with (106) are filtered out. The state is serialized in RDF as a hypernode composed of two triples with the state URI node serving as triple object for both the i_entity (1-67B) and i_attribute (1-68B) triples (108). Expanding on the Attribute example, Bob becomes the entity to which the attribute height 6'-0'" is attributed. This state is then output from the event in which the system (doctor) performs the function of measuring the height captured and executed by the event as a capability state of that doctor.

R_Subclass (1-69): A requirement that the instances of the subject class 1-410 are also instances of the wider object class, yet are differentiated by having at least one additional attribute in common from the wider class.

System (1-210): An entity 1-15 which is currently b_capable 1-64 of making a change 1-25 by performing a f_function 1-33 as captured by a capability 1-39 state for that entity (108).

Temporal Object (1-14): Any object which exists during a specific period of time. A Change 1-25 is an object capturing spatial or material change of input to output happening over a period of time in the form of an event 1-31 or process 1-32, as opposed to a state 1-26 which does not change in any way during the period of time of its existence.

M_Time (1-63): an m_measure 1-51 predicate

Triple (1-46): A directed edge in an RDF graph forming a statement in subject-predicate-object form and represented by: 1) a node for the subject, 2) an arc or arrow that goes from a subject to an object for the predicate and 3) a node for the object. Each of the three parts of the statement can be identified by a URI. An object can also be a literal value. This simple, flexible data model has a lot of expressive power to represent complex situations, relationships, and other things of interest, while also being appropriately abstract. It is this triple, in part, upon which these LDHO and LDH improve upon the current systems and methods available.

Triple Object (1-324): A Node that represents the result of the predicate function with respect to the Triple Subject input and can be either a URI, a blank node or a literal value (data).

Triple Predicate (1-325): A Node that represents the predicate relation between the Triple Subject and Triple Object and must be a URI. The predicate is a kind of function where the function takes the Triple Subject as input and the Triple Object as output with behavior specified in an Ontology.

Triple Subject (1-323): A Node of the Triple 1-46 which must be a URI or blank node similar in use to the subject of a sentence. The subject can be any resource represented by the URI.

Type (1-221): An attribute 1-13 with the i_function 1-66 t_type 1-610 and the o_result 1-65 for the class 1-310 to which all entity 1-15 states 1-26 sharing that attribute belong. The type is linked in LDH Awareness 1-413

T_Type (1-610): An m_measure 1-51 function that determines what Class 1-410 an entity 1-15 is an instance 1-411 of captured with the Type 1-221 attribute 1-13.

URI (1-37): A Uniform Resource Identifier (URI) is a unique sequence of characters that identifies a logical or physical resource used by web technologies. URIs may be used to identify anything, including real-world objects, such as people and places, concepts, or information resources such as web pages and books.

URI Node (1-44): A node 1-34 which has a URI 1-37.

Vertex: A vertex (plural vertices) is (together with edges) one of the two basic units out of which graphs are constructed. Vertices of graphs are often considered to be atomic objects, with no internal structure.

Workflow (1-38): A specification 1-28 of the logic used in determining which function to perform in what order for each causally linked event in a process 1-32.

Continued Detailed Description

Figure 1B:
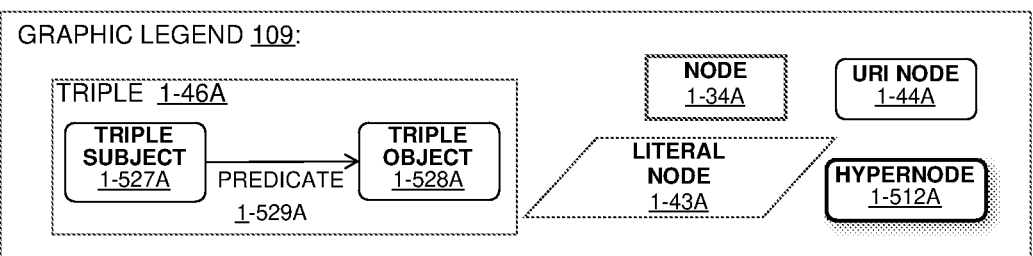
FIG. 1B illustrates the graphic legend of objects depicted.

Now referring to FIG. 1B, which is a visual graph illustrating various data structure elements associated with a Linked Data Hypergraph. A graphic legend 109 contains symbols to understanding the various structural elements used in FIGS. 1C-5. Graphic legend 109 includes a node element 1-34A having a rectangular shape indicative of NODE as described above. A URI node element 1-44A, which is a node that includes a URI that has unique sequence of characters to identify a logical or physical resource, which can include real-world objects, such as people and places, concepts, or information resources such as web pages and books. This element 1-44A includes rounded corners and thinner perimeter line. The legend 109 also includes a literal node 1-43A6, which is a node used to identify a value and as noted above can be a plain or typed. Also included in the legend 109 is a hypernode element 1-512A that is rectangular shaped, with rounded corners, a thicker line and shadow, so as to distinguish from the other elements. Hypernode elements 1-512A are critical elements of the Linked Data Hypergraph structure, as they form at least two triples as noted above. Further included in the legend 109 is a visual graphic of a triple element 1-46A that includes a triple subject node 1-214A, which is a URI node as noted by the shape, a triple predicate 1-216A, indicated by a connecting arrow, and a triple object node 1-215A, which is another URI node. The triple element's 1-46A outer shape is also rectangular with thinner line thickness. Each of the triple element types will include at least one triple, but may include more, especially those that include a hypernode element 1-512A.

Figure 1C:
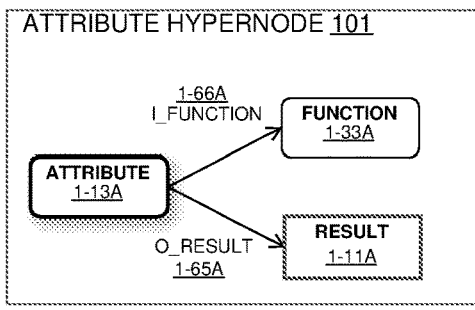
FIG. 1C is a visual graph illustrating the hypernode data structure for attributes and states.
Figure 1C:
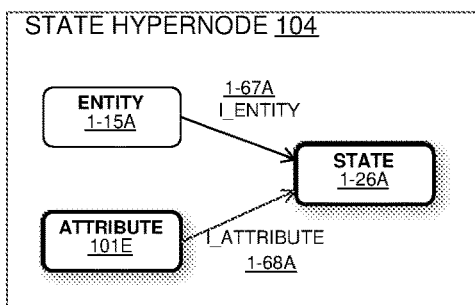
Figure 1C:
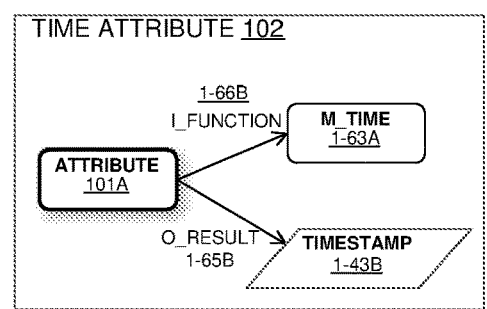
Figure 1C:
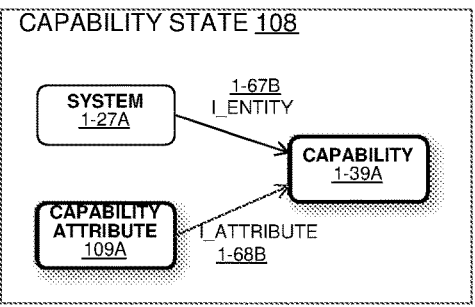
Figure 1C:
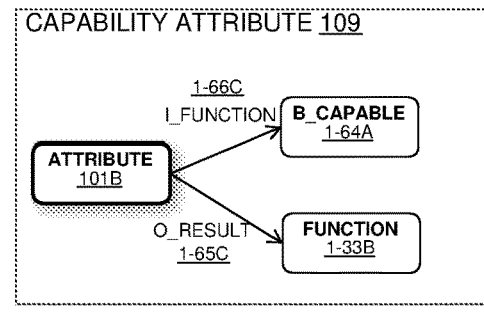
Figure 1C:
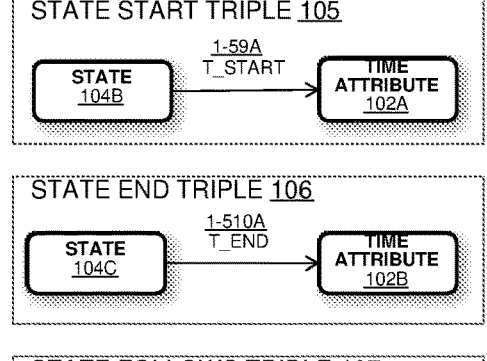
Figure 1C:
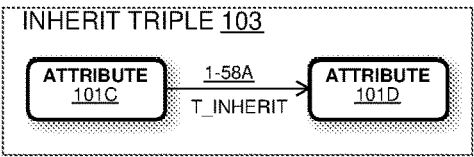
Figure 1C:
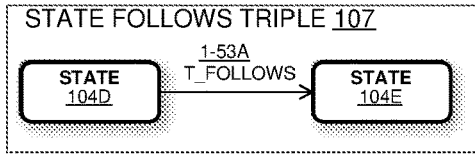

Having described the graphic legend of FIG. 1B, and now referring to FIG. 1C, which visually displays several attribute and state hypernodes, which as noted above an attribute node is one where the subject is a common node of at least two triples, while the State hypernode is one where the object is the common node of at least two triples. For example, attribute hypernode 101 is shown with a hypernode element 1-512A that is Attribute node 1-13A as the subject for two objects; function 1-33A and result 1-11A, where 1-33A is a URI type node as indicated by the legend and where 1-11A is node type. Each 1-33A and 1-11A are connected to the subject hypernode via predicate 1-66A I_function and predicate 1-65A O_result.

Another example presented is Time Attribute triple 102, which like 101 also includes a hypernode element 101A as the subject. 101A, which is an Attribute hypernode, connects to a URI node 1-63A, which is points to a measure of time M_TIME, as a result of the predicate I-Function 1-66B. Also linked via the O_Result predicate 1-65B is the literal type node 1-43B, which includes timestamp information.

To help those better understand the figures and the numbering convention, if not already apparent, each number that has an alphabetic suffix, such as A, B, C, and so forth is a use of the same class with a unique ID for reference, pending that number also has a prefix 1-such as those classes shown in FIG. 1A. For example, I-Function 1-66, which is one of the 14 LDH functions, as noted above and shown in FIG. 1A, appears in separate uses but is the same type of function, such as 1-66A, 1-66B, 1-66C, 1-66D, and 1-66E, which are conveyed in various hypernode triples, illustrating that each is part of a distinct hypernode triple.

For numbers that only have a suffix, such as A, B, C, and these also convey that is related to the original element, but is being used in a particular space and has a unique ID. For example, Time Attribute 102 that was just described is used in other instances such as in the form of 102A and 102B which refer to a Time Attribute 102 as part of another hypernode data structure.

Another example includes looking specifically at State Start Triple 105, the state hypernode 104B also has a suffix, so that includes all of the elements of the state hypernode 104 shown above 105 in FIG. 1C, which includes a predicate 1-59A, which is a T_Start 1-59 function (one of the 14 functions noted above) that links the State hypernode 104B, which includes all of the elements of state hypernode 104 to the time attribute 102A, which includes all the elements of 102.

With this guide, one skilled in the art, reviewing this description, will be able to readily understand each of the additional Hypernode Data Structures conveyed in FIG. 1C. This includes the Capability State triple 108, the capability attribute 109, the inherit triple 103, and the state follows triple 107.

Figure 2:
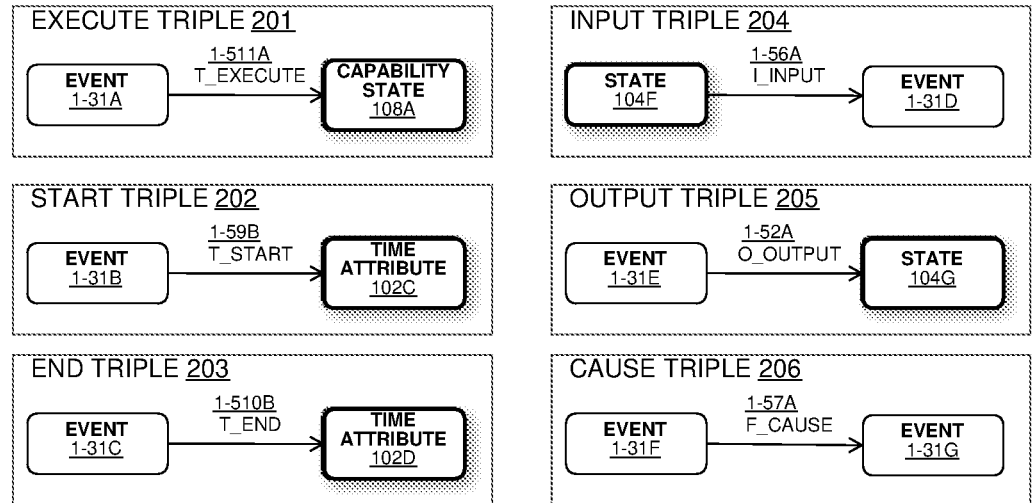
FIG. 2 is a visual graph illustrating event data structure elements associated with a Linked Data Hypergraph.
Figure 3:
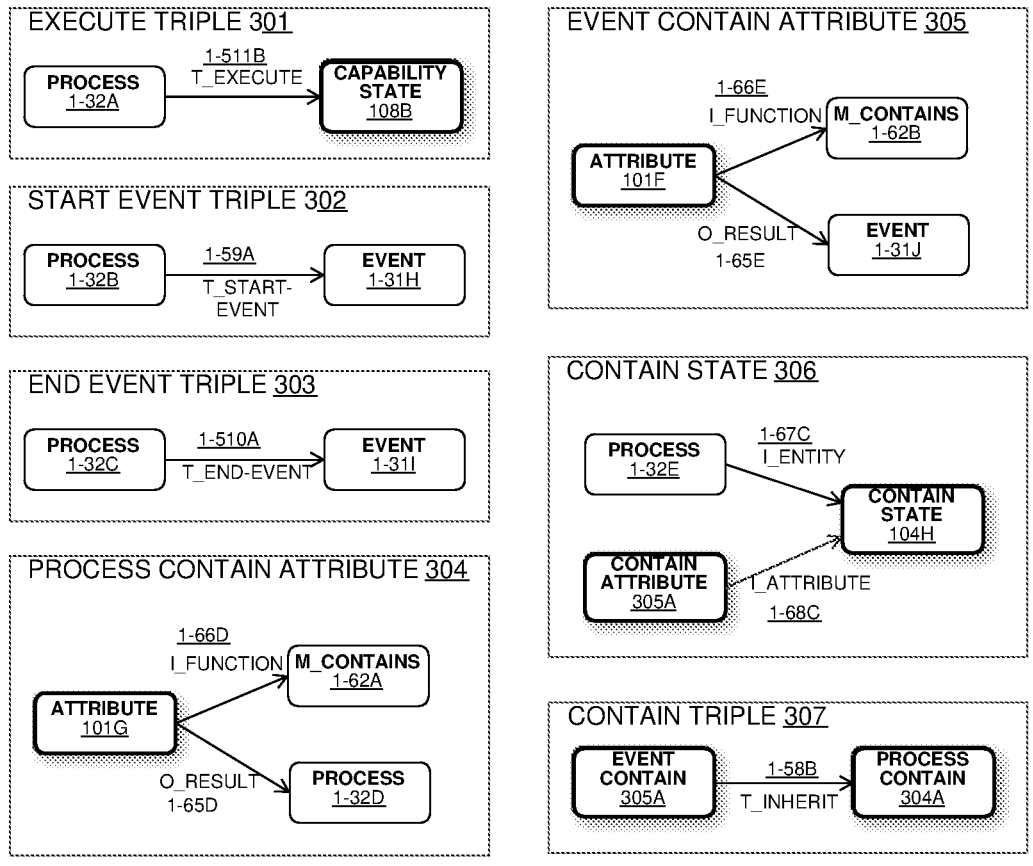
FIG. 3 is a visual graph illustrating process data structure elements associated with a Linked Data Hypergraph.
Figure 4:
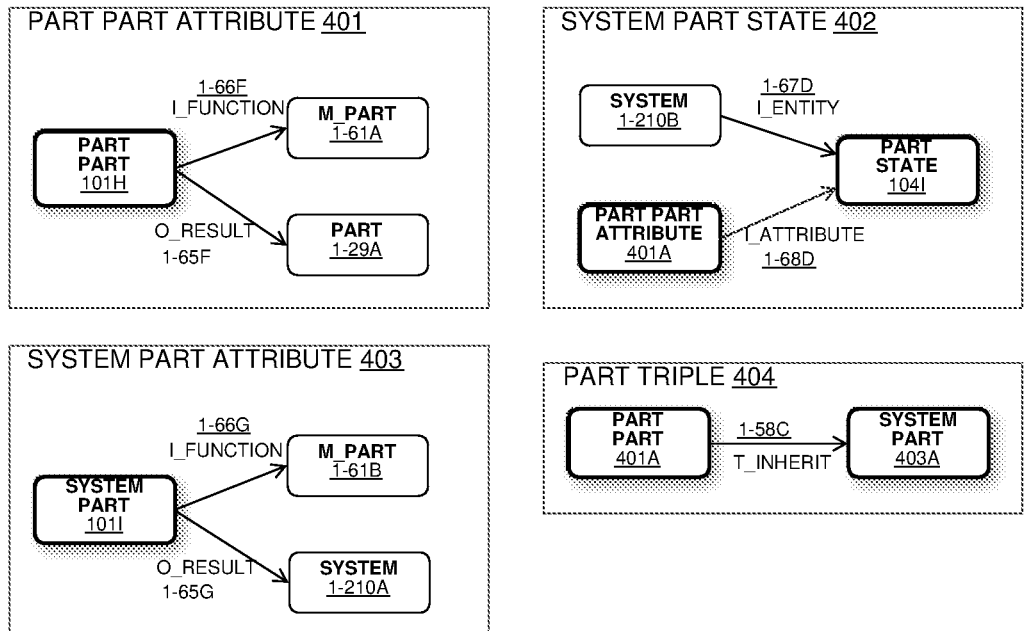
FIG. 4 is a visual graph illustrating system part data structure elements associated with a Linked Data Hypergraph.

Referring now to FIG. 2, which conveys a visual graphic of examples of Event Data Structures, which also incorporate the same naming convention principles as described above. Specifically, the execute triple 201 provides an event subject URI node 1-31A, which is linked via predicate 1-511A Execute to the object hypernode 108A, which is a capability state hypernode as shown in FIG. 1C and would include all of the structural elements of 108.

Any entity that can perform a function is a system. The state is connected to all of the events to which it FIG. 10 illustrates both the LDH system 1-310, a computer server 1005 on a network 1003 with an interface to the internet 1001 using the HTTP protocol 1002, and the operational services 1010 generated by that system. The complete data 1-217 for a digital twin 1-517 for part of the world is serialized as a separate named graph 1-515 in the RDF graph database 1012 illustrated with 3 examples 1017, 1018 and 1019, as well as the LDHO named graph 1021 providing the digital twin of the full LDH ontology 1-514 of specifications for all operational objects in the Linked Data Hypergraph Awareness 1011. The digital twin of an object can represent any object, such as a person, an organization, a building, a project etc. When the system 1-310 receives a request for a URI, it first loads into awareness 1011 an object to contain the digital twin model for that part of the world, then retrieves that specific URI request by first determining what type of object the URI represents (see FIG. 6) then loads that object as well as all related objects into awareness based on the object structure (see FIG. 9A), then infers further relations about that object based on the LDHO specifications including both state inference (see FIG. 7) and causal inference (see FIG. 8). Unlike the examples of parts of the world loaded into awareness 1013, 1014 and 1015 which can only be partially loaded based on the needs of a request, the LDHO awareness 1020 is fully loaded into awareness 1011 to provide complete computationally active specifications for all other parts of the world loaded into awareness.

Figure 6:
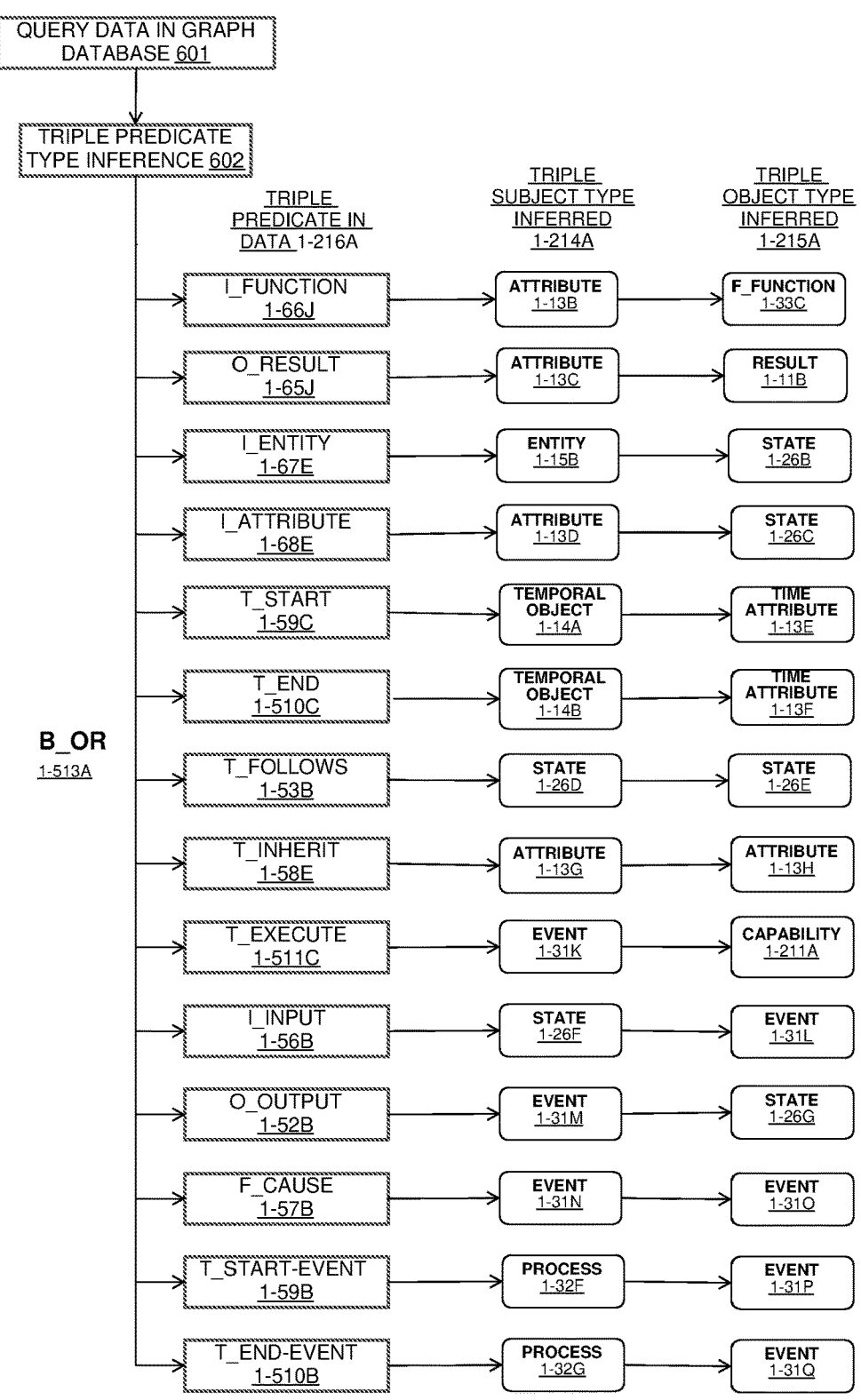
FIG. 6 outlines a method for topological type inference after querying data.

FIG. 6 illustrates the workflow of inferring the type of an object based on the topology of the triples in the graph database in which the request URI is either a triple subject or triple object.

Figure 7:
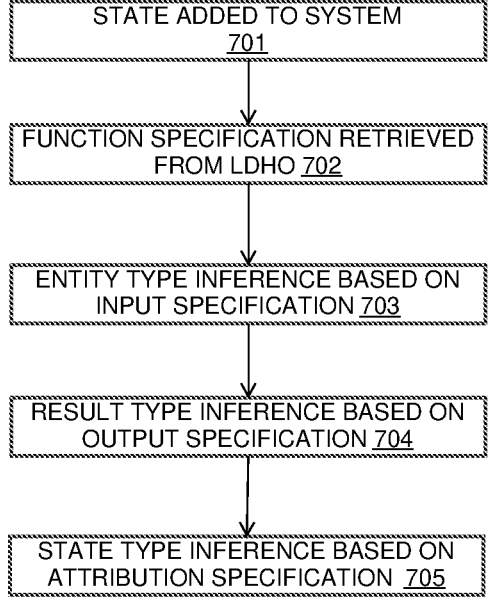
FIG. 7 outlines a method for type inference after adding states to the system.

FIG. 7 illustrates the workflow of state inference where any state added to a digital twin trigger the workflow where, based on the specifications in the LDHO for the predicate, all possible types for the entity of the state and result of the attribute are inferred.

Figure 8:
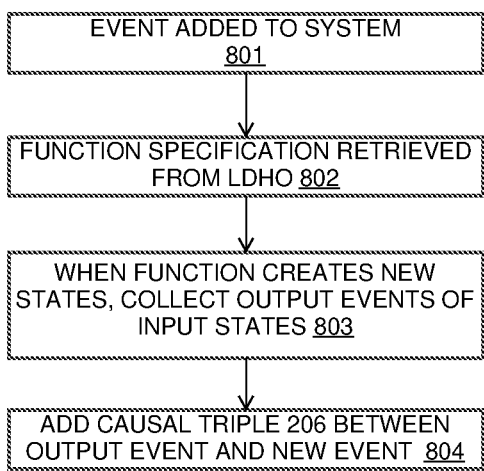
FIG. 8 outlines a method for causal inference.

FIG. 8 illustrates the workflow for inferring causal relationships by observing the flow of input to output between events.

Figure 9A:
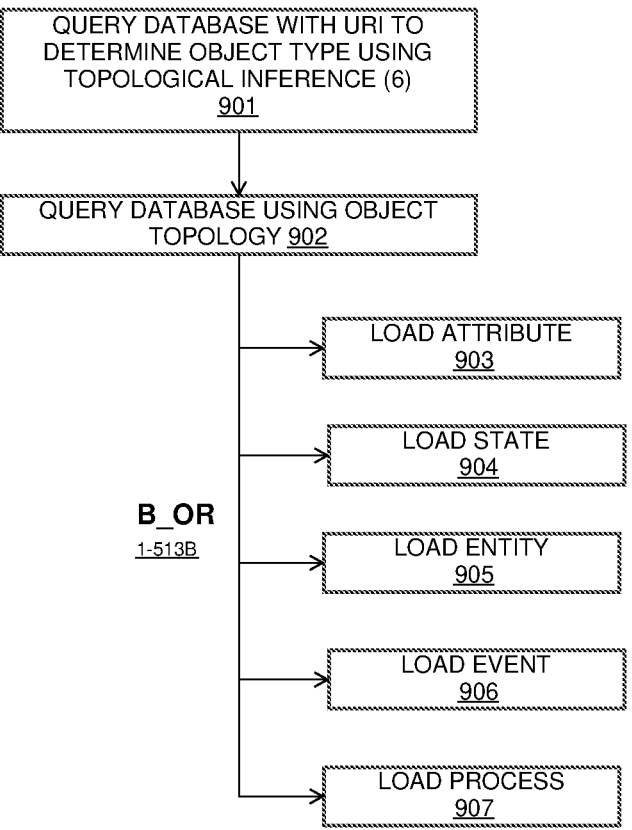
FIG. 9A outlines a method for retrieving any object from the LDH.
Figure 10:
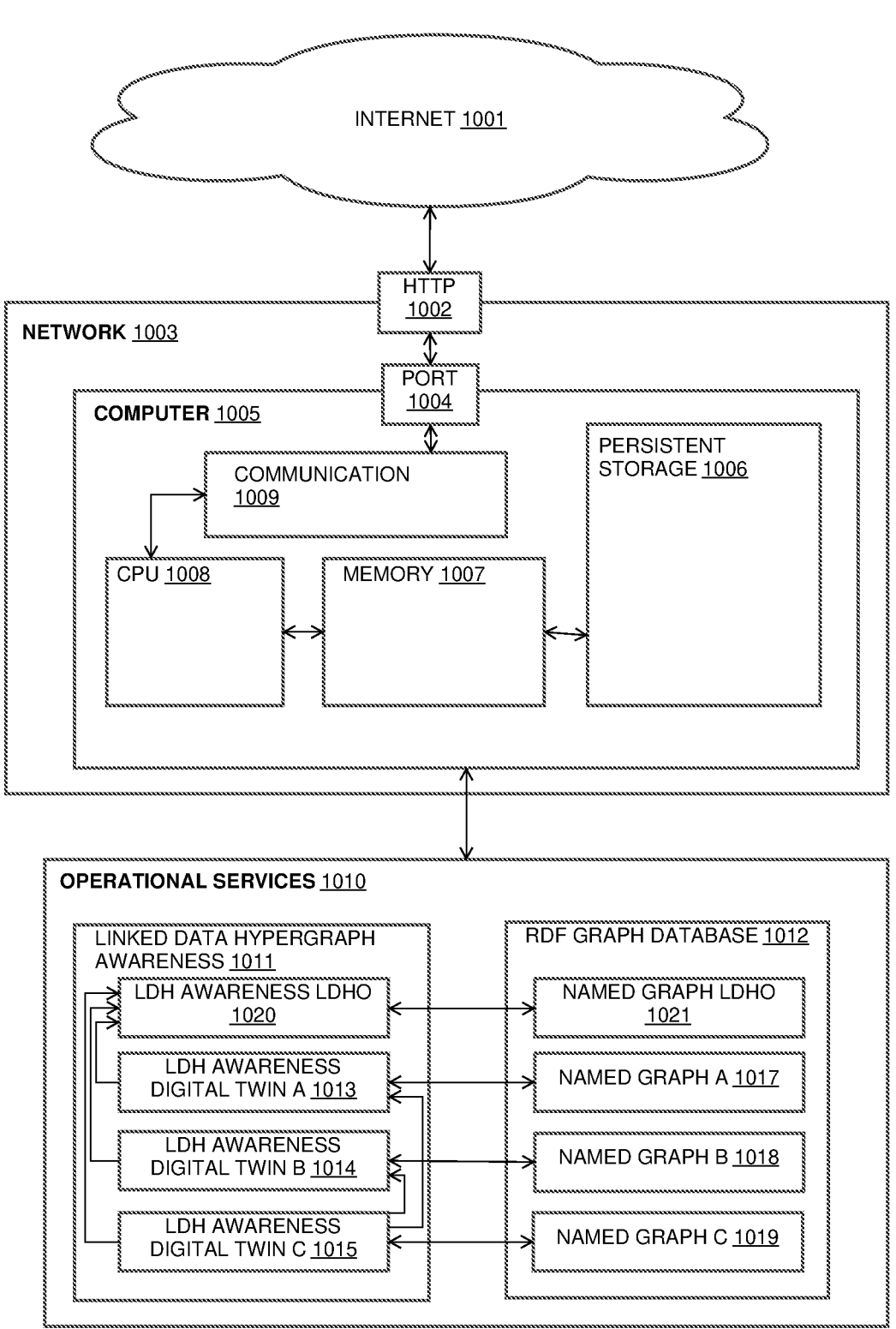
FIG. 10 illustrates the LDH System and operational services.

FIG. 9A illustrates using the method of topological type inference in FIG. 6 to determine the object type prior to loading a given object into awareness using the structure of data for that specific type of object.

Figure 9B:
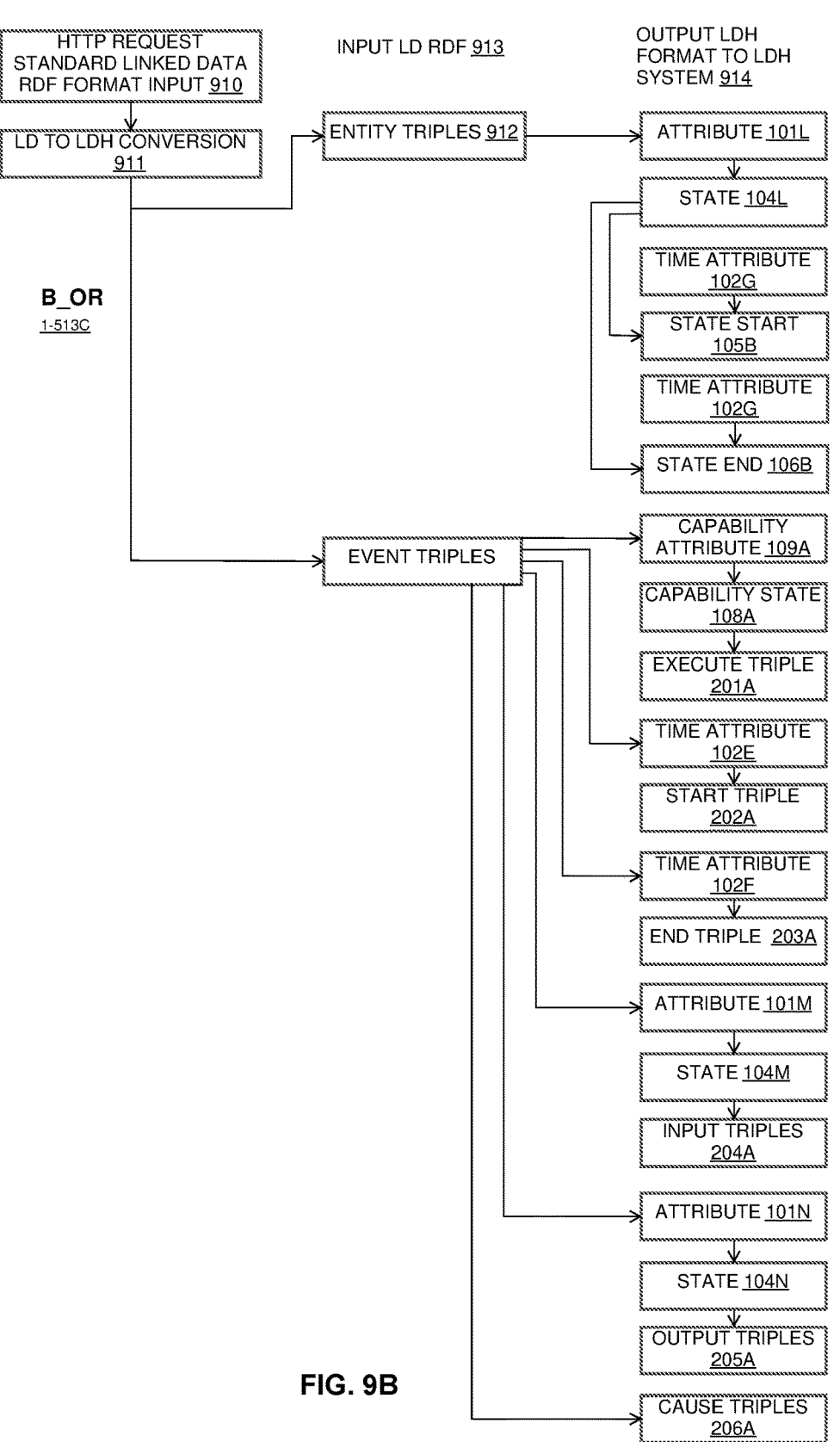
FIG. 9B illustrates one method for converting standard Linked Data triples into LDH objects for Entities and events.

FIG. 9B illustrates the method for converting standard Linked Data triples into LDH objects for Entities and events. (The method can be inverted to go from LDH objects back to LD triples)

Figure 9C:
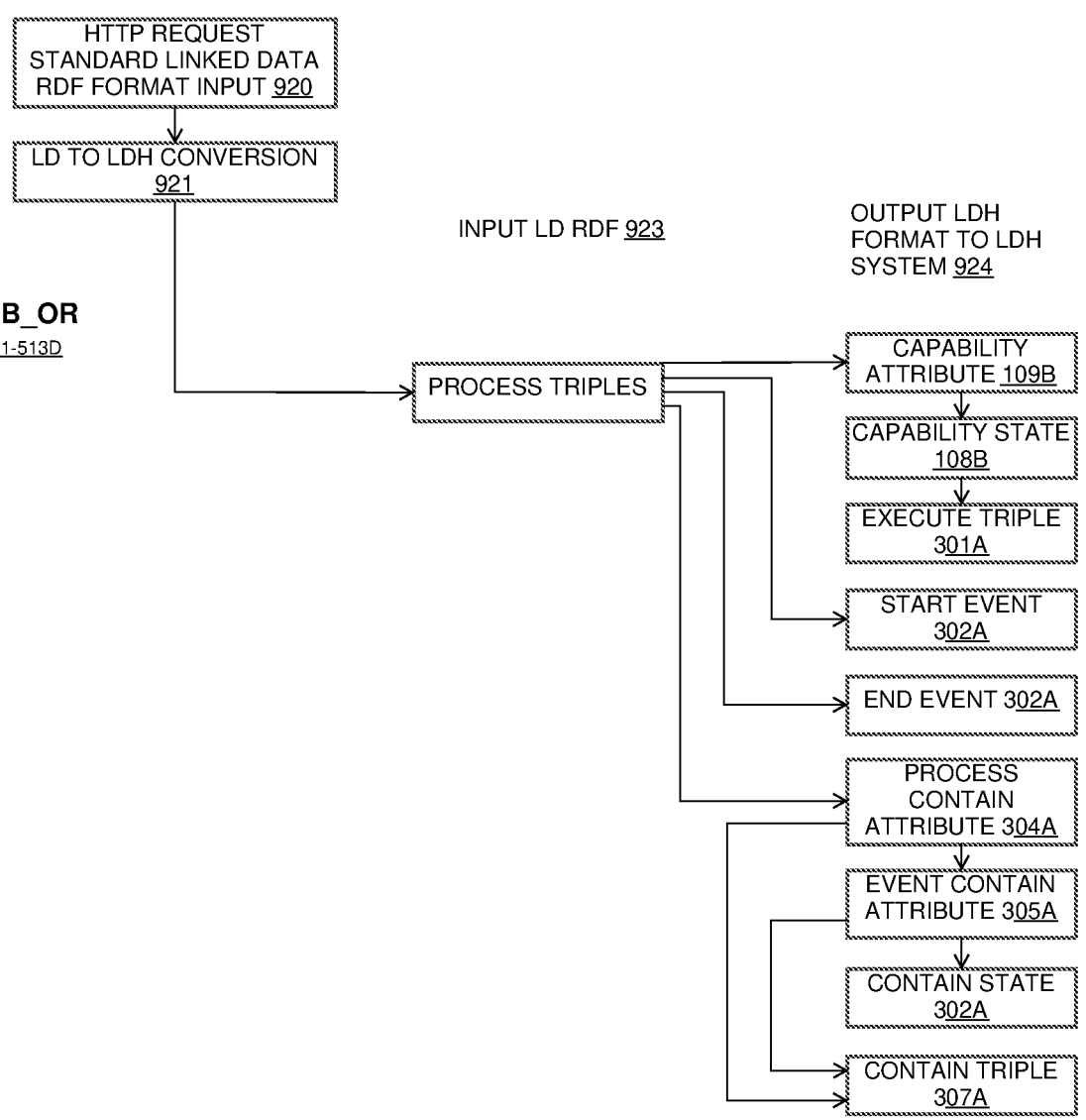
FIG. 9C illustrates another method for converting standard Linked Data triples into LDH process objects.

FIG. 9C illustrates the method for converting standard Linked Data triples into LDH process objects (The method can be inverted to go from LDH object back to LD triples)

While the principles of the invention have been described herein, it is to be understood by those skilled in the art that this description is made only by way of example and not as a limitation as to the scope of the invention. Other embodiments are contemplated within the scope of the present invention in addition to the exemplary embodiments shown and described herein. Modifications and substitutions by one of ordinary skill in the art are considered to be within the scope of the present invention.

The invention claimed is:

1. A method for saving or loading resource framework description (RDF) data to a Linked Data Hypergraph System where the RDF data is saved or loaded as a Linked Data Hypergraph structure (LDHS), wherein the LDHS utilizes a plurality of triples, where some of the plurality of triples are linked by a triple subject or triple object hypernode;

wherein one of the triple subject hypernodes is an attribute hypernode;

wherein one of the triple object hypernodes is a state hypernode;

wherein, the LDHS includes a function m_contains that is used in the state hypernode and:

captures an entity of the state hypernode acting as a container for a result of an attribute for the state hypernode;

creates a hierarchy by adding an inheritance triple between the container and the result of the attribute.

2. The method for saving or loading RDF data of claim 1, further comprising the step of utilizing a Linked Data Hypergraph ontology (LDHO) to:

infer object types from the LDHS;
infer object types from LDHO;
retrieve objects using the LDHS;
infer causality from the LDHS; and
interface with standard Linked Data systems.

3. The method of claim 2, wherein inferring object types from the data structure comprises at least one of:

inference of type Attribute for a plurality of triple subjects where triples have either a function or result predicate;

inference of type Function for triple objects that have a function predicate;

inference of type Result for triple objects that have a result predicate;

inference of type State for a plurality of triple objects where triples have either an entity, attribute, follows, or output predicate;

inference of type State for a plurality of triple subjects where triples have a follows predicate;

inference of type Entity for a plurality of triple subjects where triples have an entity predicate;

inference of type Attribute for a plurality of triple subject where triples have an attribute predicate;

inference of type State for a plurality of triple subjects where triples have an input predicate;

inference of type Capability for any state hypernode with attribute hypernode having function capable;

inference of type System for the entity of any state hypernode with attribute hypernode function capable;

inference of type Event for a plurality of triple subjects where triples have either a cause or output predicate;

inference of type Event for a plurality of triple objects where triples have either a cause or input predicate;

inference of type Cause for a plurality of triple subjects where triples have a cause predicate; and inference of type Effect for a plurality of triple objects where triples have a cause predicate.

4. The method of claim 1, wherein constructing the LDHS comprises: creating a plurality of Attribute hypernodes each in the form of two triples capturing a target function and a target result for each attribute; creating a plurality of Attribute hierarchies by creating triples with subject and object attribute hypernodes with an inherit predicate; creating a plurality of state hypernodes each in the form of two triples capturing the entity and attribute for each state; creating a plurality of state hypernodes where triples with a state in the subject position: have predicate start and a time hypernode in object position, have predicate end and a time hypernode in object position; creating a plurality of triples where state hypernodes are in the subject and object position using the predicate follows; creating a plurality of capability states where the entity is a system and the attribute hypernode function is capable and the attribute hypernode result is a function the system is capable of performing; creating a plurality of event nodes where triples with the event in the subject position: have predicate execute and a capability state hypernode in object position, have predicate start and a time attribute hypernode in object position, have predicate end and a time attribute hypernode in object position, have predicate output and a state hypernode in object position, have predicate cause and an event node in object position; creating a plurality of event nodes where triples with the event in the object position: have predicate input with a state hypernode in the subject position, have predicate cause with an event node in the subject position; creating a plurality of process nodes where triples with the process in the subject position: have predicate execute and a capability state hypernode in the object position, have predicate start-event and an event node in the object position, have predicate end-event and an event node in the object position; creating a plurality of process nodes that are the entities in state hypernodes with attributes that: have function contain with result event.

5. The method of claim 2, wherein any one of the following classes is specified in the LDHO with unique Uniform Resource Identifiers (URIs):

specification of the class Object, the root of the class hierarchy, representing anything that can be modeled;

specification of the class Attribute, a subclass of Object, which models in a single object the result of a system performing a function without reference to any object used as input to that function, the system that performed that function, or any time when that function was performed;

specification of the class State, a subclass of Object, which models in a single object an entity having a material or spatial measurement attribute for a distinct period of time and serialized in RDF with the State hypernode;

specification of the class Entity, a subclass of Object, which models any object that has or had one or more states, but may no longer have any current states;

specification of the class Change, a subclass of Object, which models the transformation of space during a period of time;

specification of the class Event, a subclass of Change, which models a system performing a function to transform input states to output states during a distinct period of time that also may cause or be caused by other events;

specification of the class Process, a subclass of Change, which models a causally linked plurality of events that may be specified with a workflow; and specification of the class Function, a subclass of Entity, which specifies how any system can change input states to output states.

6. A computerized system, comprising:

one or more hardware computer processors configured with computer-executable instructions that, when executed, cause the one or more hardware computer processors to:

create a Linked Data Hypergraph system, configured to perform the following operation services:

an RDF database having a plurality of named graphs each serializing a digital twin of an object and wherein each named graph and each serialized digital twin have a URI associated therewith; and a Linked Data Hypergraph Awareness (LDHA) configured to transform each of the serialized digital twins into a digital twin model when loaded;

wherein the Linked Data Hypergraph system is configured to save or load resource framework description (RDF) data as a Linked Data Hypergraph structure (LDHS), wherein the LDHS utilizes a plurality of triples, where some of the plurality of triples are linked by a triple subject or triple object hypernode;

wherein one of the triple subject hypernodes is an attribute hypernode;

wherein one of the triple object hypernodes is a state hypernode;

wherein, the LDHS includes a function m_contains that is used in the state hypernode and:

captures an entity of the state hypernode acting as a container for a result of an attribute for the state hypernode;

creates a hierarchy by adding an inheritance triple between the container and the result of the attribute.

7. The computerized system of claim 6, wherein each of the digital twin objects represents a full serialization of matter through space-time for that digital twin object.

8. The computerized system of claim 7, wherein one of the digital twin objects represents a serialization of a Linked Date Hypergraph Ontology (LDHO).

9. The computerized system of claim 8, wherein the LDHO is comprised of a plurality of related objects.

10. The computerized system of claim 9, wherein the LDHA is further configured to fully load a current state of all of the related objects of the LDHO.

11. The computerized system of claim 10, wherein the LDHA is further configured to respond to a URI http request by:

locating the serialized digital twin of an object represented by the URI http request;

determining a type for the URI http requested object;

loading and transforming a serialized context for the URI http requested object based on the determined type into a digital twin model in the LDHA; and returning an http response in serialized RDF format.

12. The computerized system of claim 11, wherein the LDHA is configured to perform the step of:

inferring relationships and additional types using LDHO modeled requirements after the loading and transforming step.

\* \* \* \* \*